RAYMOND H. GILLES
INVENTOR.

Oct. 28, 1969   R. H. GILLES   3,475,330
METHODS OF REMOVING AND RECLAIMING AMMONIA IONS FROM WATER
Filed Dec. 5, 1967   3 Sheets-Sheet 2

RAYMOND H. GILLES
INVENTOR.

BY

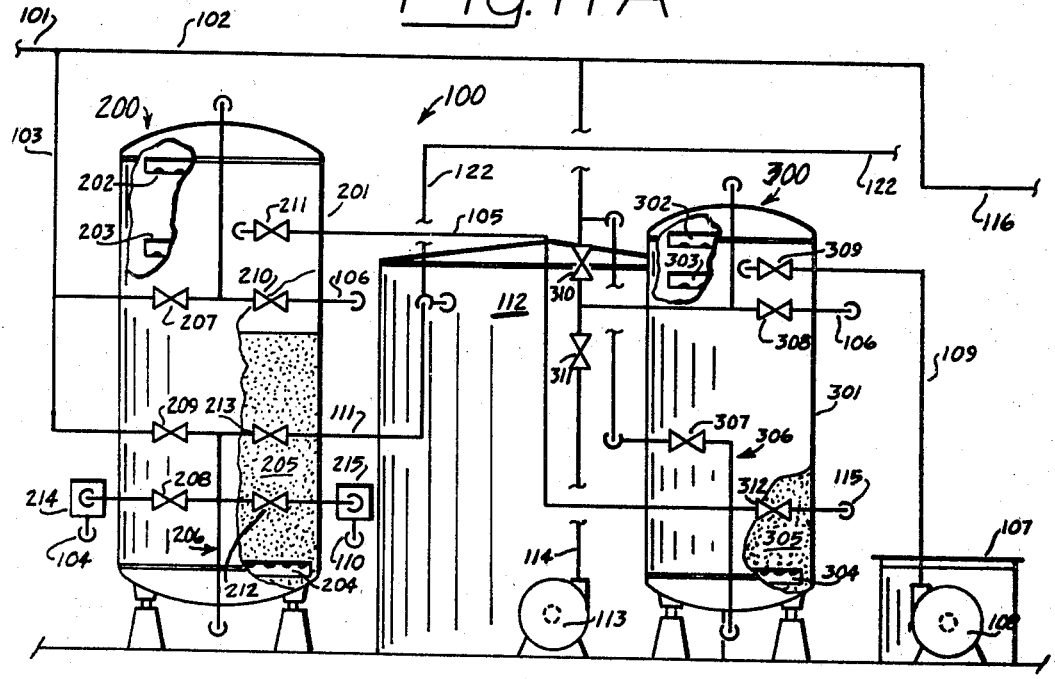

United States Patent Office 3,475,330
Patented Oct. 28, 1969

3,475,330
METHODS OF REMOVING AND RECLAIMING
AMMONIA IONS FROM WATER
Raymond H. Gilles, Odessa, Tex., assignor to Continental
Products of Texas, Odessa, Tex., a corporation of
Texas
Filed Dec. 5, 1967, Ser. No. 688,239
Int. Cl. C02b 1/44
U.S. Cl. 210—25
24 Claims

ABSTRACT OF THE DISCLOSURE

The several embodiments of the invention described herein are directed to methods and apparatus whereby an ammonia-contaminated water is contacted with weakly-acidic cation-exchange media to remove the ammonia or ammonium contaminating ions. Thereafter, an inorganic acid is successively contacted with strongly-acidic cation-exchange media and the weakly-acidic cation-exchange media to regenerate these media. These media are then rinsed to recover the ammonia or ammonium ions as a solution. The initial portion of this solution is removed for reclamation and the remaining weaker portion is contacted with the strongly-acidic cation-exchange media for obtaining a weak, but useful, solution of acid as a by-product, with the collected ions being retained by the strongly-acidic media for subsequent reclamation in successive cycles. Methods and apparatus are also disclosed for effective reclamation and for obtaining deionized water as an alternate useful by-product.

---

Figure 1:
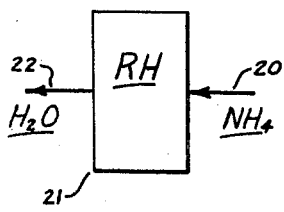

Accordingly, as will subsequently become apparent, the present invention pertains to methods and apparatus for the treatment of water. More particularly, the present invention is directed to new and improved methods of removing ammonia and ammonium ions from water streams by ion-exchange techniques as well as for reclaiming all waste products resulting from the ion-exchange process.

Most modern fertilizer plants employ one or more so-called "catalytic reformers" to produce ammonia from which synthetic fertilizers are in turn manufactured. Although such catalytic reformers consume large quantities of high-pressure steam, it has not been feasible until just recently to reuse the steam condensates from these reformers since these condensates are typically too contaminated with ammonia and other ammonia compounds to be returned to the plant's steam system. It has been found, however, that such ammonia-contaminated condensates can be efficiently reclaimed by employing one of the procedures set forth in my copending application, Ser. No. 654,473, filed July 19, 1967.

In general, the procedures disclosed in the aforementioned application are accomplished by passing ammonia-contaminated condensates through any one of several specified ion-exchange mediums in the ionic hydrogen form to remove ammonia and ammonium ions from the influent water and replace these undesirable ions with hydrogen ions. When the ion-exchange medium is exhausted, it is regenerated with a suitable inorganic acid to restore the ion-exchange medium to its original hydrogen form and remove therefrom the ammonia and ammonium ions in the form of various correlative ammonium salts. Although these procedures are very effective, provisions must be made for disposal of the contaminated rinse water and spent regenerants that are exhausted from the ion-exchange medium as it is regenerated. As pointed out in this copending application, there will be many situations where these exhausted waters can be simply returned to the ammonia plant as a dilute, but still useful, feed stock. In other instances, however, the added expense of evaporating the excess water from these relatively weak solutions may be considered to be economically unattractive particularly where fuel costs are a significant consideration.

Accordingly, it is an object of the present invention to provide new and improved methods of reclaiming ammonia-contaminated waters as well as the waste products formed as a result thereby.

This and other objects of the present invention are accomplished by serially contacting first and second cation-exchange mediums with first an acid solution and then a suitable rinse solution to regenerate the ion-exchange mediums and prepare them for further service. During this period, an effluent is obtained that is initially of sufficient strength to warrant reclamation of the correlative ammonium salts therein. Then, once the strength of the rinse effluent is decreased to less than a predetermined level, the remainder of the effluent is collected. Once the ion-exchange mediums are regenerated, ammonia-contaminated water is again contacted with the first ion-exchange medium to remove the ammonia from the water and the contaminated rinse effluent collected from the rinsing cycle is contacted with the second ion-exchange medium to obtain a weak, but useful, solution of the acid regenerant. The contaminating ions recovered by the second ion-exchange medium will ultimately be reclaimed in subsequent cycles.

In an alternative embodiment of the present invention, this reclaimed weak-acid solution is subsequently reclaimed by contacting it with an anion-exchange medium to obtain distilled water. To regenerate this anion-exchange medium, anhydrous ammonia or ammonium hydroxide is contacted therewith and the regeneration and subsequent rinse effluents are also reclaimed an collecte in the same manner as in the above-described first embodiment.

Figure 8:
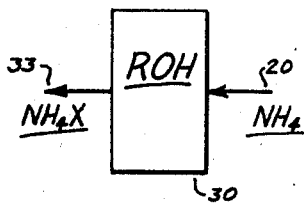
Figure 9:
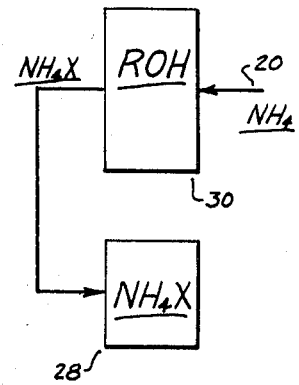
Figure 10:
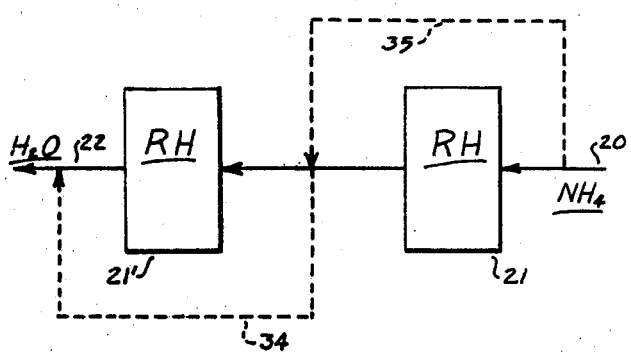

The novel features of the present invention are set forth with particularity in the appended claims. The present invention, both as to its organization and manner of operation together with further objects and advantages thereof, may best be understood by way of illustration and example of certain procedures and embodiments as illustrated in the accompanying drawings, in which:

FIGURES 1–5 schematically illustrate the successive steps of one manner of practicing the methods of the present invention;

FIGURES 6–9 schematically illustrate the additional steps of an alternate manner of practicing the methods of the present invention;

FIGURE 10 schematically depicts another modification of the procedures shown in FIGURES 1–5, with this procedure also being in accordance with the present invention; and FIGURES 11–A and 11–B depict representative apparatus arranged in accordance with the principles of the invention that may be employed for practicing the methods respectively illustrated in FIGURES 1–5 and FIGURES 6–9.

As pointed out in the aforementioned copending application, although ammonia may be present in water, it is generally believed that ammonia will most likely be present in steam condensates as ammonium bicarbonate [$NH_4HCO_3$] which results from the combination of one molecule each of ammonia [$NH_3$], carbon dioxide [$CO_2$], and water [$H_2O$]. Similarly, the ammonia might also be present in the form of ammonium hydroxide [$NH_4OH$], ammonium carbonate [$(NH_4)_2CO_3$], or ammonium bicarbonate [$NH_4HCO_3$]. It is immaterial, however, to the success of the present invention as to which one or ones of these ammonia compounds are present in an influent stream to be treated.

Accordingly, as schematically represented in FIGURE 1, an ammonia-contaminated water 20 is contacted with a cation-exchange medium 21 selected in accordance with the principles of the invention disclosed in the aforementioned copending application.

As the ammonia-contaminated water 20 (assumed for the purposes of this example to have only ammonium bicarbonate [$NH_4HCO_3$] as the contaminant) contacts the ion-exchange medium 21 (represented in the drawings and the following equations by the letter R), one ammonium ion [$NH_4$] will be exchanged for one hydrogen ion [H] on the ion-exchange medium, with the ammonium ion being retained by the ion-exchange medium and the hydrogen ion being released therefrom to enter the effluent stream 22 and be discharged therefrom. This ion-exchange process can best be represented as follows:

$$NH_4HCO_3 + RH \rightarrow RNH_4 + H_2O + CO_2 \quad \text{(Eq. 1)}$$

Thus, for each ammonium ion captured by the ion-exchange medium 21, the effluent stream 22 will now contain one ion of hydrogen. The bicarbonate ion [$HCO_3$] which was formerly combined with the ammonium ion [$NH_4$] being an anion will, of course, be unaffected by this ion-exchange process. However, since bicarbonate ions are inherently unstable, as the influent stream 20 contacts the ion-exchange medium 21, each of the hydrogen ions released from the ion-exchange medium will readily combine with one of the bicarbonate ions and form one molecule each of water and carbon dioxide in the effluent stream 22.

Accordingly, the effluent stream 22 from the ion-exchange medium 21 will contain only carbon dioxide as a contaminant which, as recognized in the art, can be readily removed by conventional methods such as, for example, aeration. It should be realized, however, that where the reclaimed effluent 22 is to be returned to a plant steam system, it would be more efficient to merely inject the reclaimed effluent into the feedwater-heating deaerator (not shown) which will, of course, remove the unwanted carbon dioxide.

Once the ion-exchange medium 21 is no longer efficiently removing the unwanted ammonium ions in the stream 20, the medium must, of course, be regenerated. As brought out in the aforementioned application, a strong inorganic acid is brought into intimate contact with the ion-exchange medium 21 for a sufficient length of time for the hydrogen ions in the acid to be exchanged for the ammonium ions that are then held by the ion-exchange medium. The regeneration processes for the ion-exchange medium 21 will, of course, depend upon the particular acid used for the regenerant. For example, by using a quantity of sulfuric acid [$H_2SO_4$] as the regenerant, the regeneration process will be:

$$H_2SO_4 + 2RNH_4 \rightarrow 2RH + (NH_4)_2SO_4 \quad \text{(Eq. 2)}$$

Similarly, where nitric acid [$HNO_3$] is used as the regenerant, the regeneration process will be:

$$HNO_3 + RNH_4 \rightarrow RH + NH_4NO_3 \quad \text{(Eq. 3)}$$

With hydrochloric acid [HCl], the ion-exchange medium 11 will be regenerated as follows:

$$HCl + RNH_4 \rightarrow RH + NH_4Cl \quad \text{(Eq. 4)}$$

The quantities of sulfuric acid required for regenerating the ion-exchange medium 21 are determined in accordance with FIGURE 1 of the aforementioned copending application which is incorporated herein by reference. Similarly, as also pointed out in that application, the amount of either of these other two regenerants can be determined by calculating the quantity of the selected acid required to provide the same equivalent weight of hydrogen ions as would be found in the required quantity of sulfuric acid designated in FIGURE 1 of the copending application for treatment of a particular water.

It will be appreciated, therefore, that in the practice of the invention disclosed in the aforementioned application, the correlative ammonium salt resulting from the regeneration can be disposed of in some situations by simply returning the regeneration effluent to the fertilizer plant as a dilute, but useful, by-product which must be reconcentrated. In the present invention, however, the expended regenerant is reclaimed in such a manner that a more economically feasible by-product is obtained.

Figure 2:
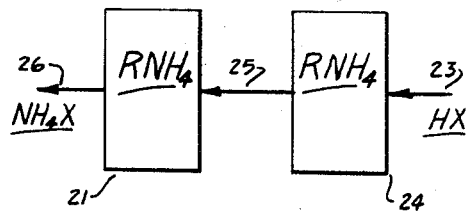

Accordingly, as shown in FIGURE 2, in practicing the present invention, a suitable inorganic acid 23 is first contacted with a strong-cation ion-exchange medium 24 which is at this time also exhausted (as represented in FIGURE 2 by the symbol "$RNH_4$"). It will be appreciated, of course, that the total quantity of the regenerant 23 required must be sufficient to regenerate the strong-cation ion-exchange medium 24 as well as the ion-exchange medium 21. It will be noted in the drawings that the regenerant acid 23 is designated by the symbol "HX," with the "X" being used to represent the anion portion of the acid. In this manner, the acidic anion X ($SO_4$, $NO_3$ or Cl) can be followed during successive steps of the methods of the present invention shown in the drawings.

At the outset of the regeneration cycle depicted in FIGURE 2, the regenerant 23 will contact the strong-cation ion-exchange medium 24 first and, therefore, begin regenerating it first. The resulting regeneration process for the strong-cation medium 24 will be the same as one of those described above in Equations 2–4 with respect to the ion-exchange medium 21 depending, of course, upon which strong acid is employed as the regenerant 23. Thus, during the initial stages of the regeneration cycle as depicted in FIGURE 2, the correlative ammonium compounds (represented as "$NH_4X$") being elutriated from the ion-exchange medium 24 at 25 will be contacted with the ion-exchange medium 21. It will be appreciated, of course, that since many strongly-acidic cation-exchange mediums have such a low affinity for hydrogen, some of the regenerant acid may pass on through the cation-exchange medium 24 from the outset and begin to regenerate the weakly-acidic medium 21 as well. In any event, the correlative ammonium compound in the regeneration effluent 25 leaving the strong-cation ion-exchange medium 24 will be unchanged by its contact with the cation-exchange medium 21 and be removed therefrom at 26.

The above-described flow of the regenerant 23 is continued without interruption. As a result, the ion-exchange medium 24 will be regenerated to an optimum capacity; and, as this optimum capacity is approached and reached, the regeneration effluent 25 contacting the ion-exchange medium 21 will contain a correspondingly increasing quantity of unexpended acid. Thus, as the excess of acid in the effluent 25 increases, regeneration of the ion-exchange medium 21 will continue until the weakly-acidic medium is fully regenerated in accordance with the applicable one of the above-described regeneration equations (Equations 2–4) to maintain an uninterrupted flow of the correlative ammonium salt $NH_4X$ at 26 from this second ion-exchange medium 21. These ammonium salts being elutriated from the ion-exchange medium 21 at 26 will, of course, continue so long as this medium is being regenerated.

It is of particular significance to note that by contacting the regenerant acid 23 with the ion-exchange medium 24 first, maximum regeneration of that medium will be obtained. Thus, for reasons that will subsequently become more apparent, a maximum exchange capacity will be assured for the ion-exchange medium 24.

Figure 3:
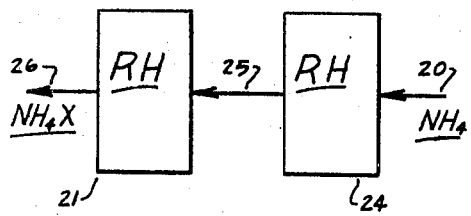

Once the required quantity of regenerant acid 23 has been contacted with the ion-exchange mediums 21 and 24, a rinse cycle is commenced. Accordingly, as shown in FIGURE 3, the condensate stream 20 is serially contacted with the ion-exchange medium 21 and 24 to complete the regeneration of the ion-exchange medium 21 and remove the final traces of the more concentrated ammonium salts therein.

Figure 4:
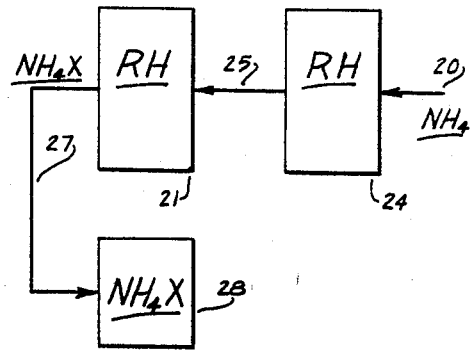

The concentration of the correlative ammonium salt NH₄X being elutriated from the ion-exchange mediums 21 and 24 during the regeneration cycle as well as the initial phase of the rinse cycle will be of a sufficiently high concentration that the effluent stream 26 can be directed to the fertilizer plant for efficient recycling there. In time, however, after the ion-exchange medium 21 becomes regenerated and the rinse cycle is well underway, the concentration of the correlative ammonium salt NH₄X being exhausted therefrom at 26 will drop below an economically reclaimable level. Once this occurs, as seen in FIGURE 4, this very dilute regenerant effluent 27 from the ion-exchange medium 21 is collected in a suitable storage tank or the like as at 28 for a subsequent purpose.

Accordingly, at the conclusion of the above-described regeneration process, the ion-exchange mediums 21 and 24 will have been restored to their ionic hydrogen form and will again be in readiness to remove ammonium ions. The more concentrated portion of the regenerant and rinse cycle effluents 26 from the ion-exchange mediums 21 and 24 will have been returned to the process streams of the fertilizer plant for efficient reclamation and the remaining less concentrated effluent 27 will have been stored in the tank 28 as a dilute solution of the correlative ammonium salt NH₄X resulting from regeneration and rinsing of the ion-exchange mediums.

Figure 5:
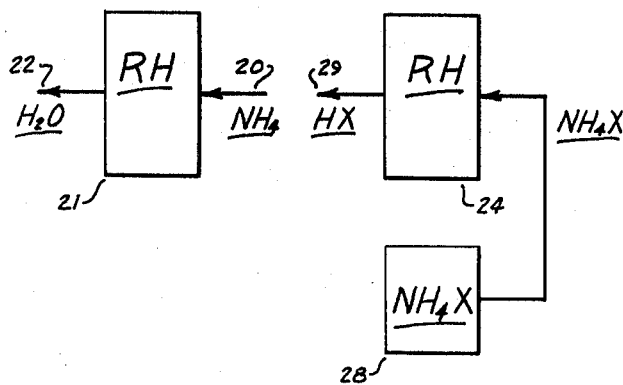

Turning now to FIGURE 5, the ion-exchange medium 21 is shown as again removing ammonia and ammonium ions from the contaminated condensate stream 20 in the same manner as previously described with respect to FIGURE 1. The ion-exchange medium 24 is, however, now in the ionic hydrogen form and the more-dilute portion of the ammonium salts NH₄X previously stored in the tank 28 is contacted with the strong-cation medium. The resulting treated effluent 29 from the ion-exchange medium 24, is a dilute acid HX, with the nature of this acid, of course, being dependent upon which ammonium salt has previously been stored in the tank 28. For example, if sulfuric acid [H₂SO₄] is used for the regenerant HX at 23 (FIGURE 2), the correlative ammonium salt NH₄X contained in the tank 28 will be ammonium sulfate [(NH₄)₂SO₄] in accordance with Equation 2 above. Thus, the particular ion-exchange process that will result by contacting this weak solution of ammonium sulfate with the regenerated ion-exchange medium 24 will be as follows:

$$(NH_4)_2SO_4 + 2RN \rightarrow 2RNH_4 + H_2SO_4 \quad (Eq.\ 5)$$

Similarly, where nitric acid [HNO₃] is used as the regenerant 23, dilute ammonium nitrate [NH₄NO₃] will be in the tank 28; and, as this ammonium salt is contacted with the regenerated strong-cation medium 24, nitric acid will be obtained:

$$NH_4NO_3 + RH \rightarrow RNH_4 + HNO_3 \quad (Eq.\ 6)$$

On the other hand, where hydrochloric acid [HCl] is used to regenerate the ion-exchange mediums 21 and 24, the dilute regenerant NH₄X in the tank 28 will be ammonium chloride [NH₄Cl] and, as it is contacted with the regenerated strong-cation medium 24, hydrochloric acid will be recovered:

$$NH_4Cl + RH \rightarrow RNH_4 + HCl \quad (Eq.\ 7)$$

It will be appreciated, therefore, that in each of the processes described by Equations 5–7, the resultant acid 29 recovered by the strong-cation medium 24 is the same as the acid regenerant HX at 23 used to regenerate the ion-exchange mediums 21 and 24. The strength of these reclaimed acid solutions 29 will, of course, be substantially lower (typically no more than about 0.5% to 1% strength) but will, nevertheless, be an acid rather than an ammonium salt.

Those skilled in the art will readily appreciate that the reclaimed acid 29 can be economically consumed without producing an associated contamination problem as would be the case for an ammonium salt. For example, the reclaimed acid 29 can be effectively used to assist in controlling the alkalinity of the makeup water to a cooling tower (not shown). Moreover, as weak as they may be, these reclaimed acids 29 can often be economically reclaimed in an acid manufacturing plant which is usually associated with a typical fertilizer plant. Furthermore, some of these reclaimed acids can also be employed to dilute the regenerant acid 23. Thus, in any event, only a strong organic acid must be supplied in practicing this method of the present invention and only a weaker solution of this same acid is left for disposal in one way or another.

Turning now to the particular ion-exchange mediums that may be used for practicing the method of the present invention depicted in FIGURES 1–5. It will, of course, be recognized by those skilled in the art that only an ion-exchange medium capable of reversibly exchanging ammonium ions for hydrogen ions can be employed for the ion-exchange medium 21. As pointed out in the above-mentioned copending application, only the following synthetic organic ion-exchange resins are known at present to be suitable for the ion-exchange medium 21 in practicing the present invention:

| Trade nomenclature | Manufacturer |
|---|---|
| "Amberlite" IRC–84 | Rohm & Haas Co. Philadelphia, Pa. |
| "Dowex" CCR–1 | Dow Chemical Co. Midland, Mich. |
| "Duolite" ES–80 | Chemical Process Co. Redwood City, Calif. |

Each of these resins are commercially available in hard synthetic particles or bead-like granules that are customarily supplied in the ionic hydrogen form. Although the particular resins may vary somewhat in their properties depending upon their manufacturer, each of these commercial resins are presently marketed as a so-called weakly acidic, cation-exchange synthetic resin containing carboxylic acid and, in some instances, either acrylic or phenolic groups as their functional sites. Typical test results for the above-mentioned "Amberlite" IRC–84 are given in the aforementioned copending application and are incorporated herein by reference.

With respect to the ion-exchange medium 24, it will be realized that any strong-cation ion-exchange medium that is capable of "salt-splitting" or converting a neutral salt to its corresponding acid form (more particularly, reversibly exchanging hydrogen ions for ammonium cations) can be used for the present invention. It will be appreciated, of course, that most, if not all, of such strong-cation ion-exchange mediums that are presently available incorporate sulfonic acid groups as their functional sites. Typical of the ion-exchange resins possessing these characteristics are:

| Trade Nomenclature | Manufacturer |
|---|---|
| "Amberlite" IR–120 IR–122 IR–200 | Rohm & Haas Co. Philadelphia, Pa. |
| "Dowex" HCR HGR HDR | Dow Chemical Co. Midland, Mich. |
| "Duolite" C–20 C–25 | Chemical Process Co. Redwood City, Calif. |
| Permutit "Q" "QB" "QC" | The Permutit Co. New York City, N.Y. |

It will be appreciated from the foregoing description of the new and improved method depicted in FIGURES 1-5 that for a given volume of a particular condensate influent 20 contacting the ion-exchange medium 21, corresponding amounts will be obtained of the correlative ammonium salt at 26 and 27 as well as of the dilute acid at 29. The relative proportions of the volume of condensate treated to the amount of correlative ammonium salts obtained at either 26 or 27 will, of course, vary according to the particular installation. Within reasonable limits, there will, however, always be more condensate treated than resulting solutions of ammonium salts. Moreover, by drawing off the more-concentrated first portion of the correlative ammonium salts (as at 26) for reclamation in the fertilizer plant, a significant economic advantage will be realized. Similarly, the dilute acid obtained at 29 will also be of economic benefit as well as serving as a convenient means for consuming the remaining waste products from the present invention.

To illustrate the relative quantities of fluids involved in a typical situation, a laboratory experiment was conducted in accordance with established ion-exchange testing procedures. In this experiment, a test cell of typical dimensions was prepared with 750-ml. of the above-mentioned "Amberlite" IRC–84 resin as the ion-exchange medium 21. A second test cell was also prepared with 100-ml. of "Amberlite" IR–200 for the ion-exchange medium 24.

A test solution of ammonium bicarbonate $$[NH_4HCO_3]$$

was then prepared so as to have a pH of 7.9 and a concentration of 900-p.p.m. of ammonium ions (expressed as $NH_3$). This solution was then passed downwardly at a rate of 0.27-ml./min. per ml. of resin through the above-mentioned test cell of IRC–84 resin with the following results:

TABLE 1

| Calculated, gal./cu. ft.: | Leakage, p.p.m. $NH_3$ | Conductivity, micromhos | Calculated, grains/grains /cu. ft. |
|---|---|---|---|
| 147.8 | 2 | 22 | 22,849 |
| 156.9 | 3 | 25 | 24,244 |
| 174.6 | 10 | 60 | 26,990 |
| 197.6 | 35 | 143 | 30,545 |
| 214.7 | 62 | 200 | 33,189 |
| 241.7 | 102 | 500 | 37,362 |
| 281.2 | 187 | 800 | 43,469 |
| 302.2 | 245 | 1,100 | 46,715 |
| 333.0 | 312 | | 51,468 |

From these results, it can be seen that the IRC–84 resin has a capacity of about 24,000-grains/cu. ft. (expressed as $CaCO_3$) for substantially total removal of ammonium or ammonia ions from a typical influent stream.

To regenerate the two cells, 409-ml. of a 25% solution of nitric acid $[HNO_3]$ was serially passed through first the strong-cation cell and then through the weak-cation cell at a rate of 0.10-ml./min. per ml. of IRC–84 resin. This was followed with 200-ml. of the above-described test solution to initiate the rinsing of the two columns. At this point, the rinsing of the strong-cation cell was completed and an additional 4,200-ml. of the test solution was passed through only the weak-cation column to complete rinsing of that cell. It will be recognized that the strong-cation cell was much smaller and that this volume of rinse solution was equivalent to a total rinse quantity of 15.0-gal./cu. ft. of the strong-cation resin. Moreover, as previously noted, the serial regeneration of first the strong-cation cell and then the weak-cation cell will insure a maximum capacity for the strong-cation cell. Thus, inasmuch as the presently known strongly-acidic cation resins listed above typically have a relatively lower regeneration efficiency than the weakly-acidic cation resins, a complete regeneration will be obtained for the strongly-acidic resin without impairing the regeneration of the weakly-acidic resin.

Testing of the effluent from the weak-cation column throughout the rinse cycle showed the following results:

TABLE 2

| | Leakage as percent $NH_4NO_3$ | Conductivity, micromhos |
|---|---|---|
| Calculated, gal./cu. ft.: | | |
| 1.21 | 19.7 | |
| 2.41 | 19.5 | |
| 3.62 | 19.2 | 218,000 |
| 4.83 | 18.6 | 170,000 |
| 6.03 | 15.6 | 150,000 |
| 7.24 | 7.0 | 118,000 |
| 8.45 | 1.0 | 42,000 |
| 9.65 | | 19,000 |
| 10.86 | | 3,300 |
| 12.07 | | 1,350 |
| 13.27 | | 690 |
| 14.48 | | 170 |
| 15.68 | | 125 |
| 16.89 | | 35 |
| 18.09 | | 17 |
| 19.30 | | 12 |

To test the efficiency of the reclamation of that portion of the weaker portion of the rinse effluent that is to be collected, a test solution of 0.5% ammonium nitrate $[NH_4NO_3]$ was prepared and passed through the above-mentioned strong-cation test cell. Tests such as this indicated a capacity of about 43,000-grains/cu. ft. as $CaCO_3$ are normal for a resin such as the IR–200 strong-cation resin.

Table 2 clearly indicates that a rinse of more than about 20-gallons/cu. ft. of resin fails to accomplish any significant benefit. Thus, in practicing the present invention, it is preferred to halt the rinsing cycle at about this limit. It will further be appreciated from Table 2 that the correlative ammonium salt solution (ammonium nitrate in this instance) elutriated from the weak-cation cell during a significant portion of the rinse cycle is of sufficient strength to be economically reclaimed. Although the particular economic factors for a given fertilizer plant will enter into consideration, at least half of the rinse effluent can usually be economically reclaimed without further treatment and the remaining more-dilute solution can be stored as at 28 in FIGURE 4 for ultimate reclamation. The relative proportion of water requiring further treatment will, of course, depend upon the amount of contaminant to be removed but comparison of Tables 1 and 2 indicates that where only minimum ammonia leakage can be tolerated, about 150-gallons of a contaminated condensate of this strength will be treated for each cubic foot of the weak-cation resin before regeneration is required. Then, about 20-gallons of the condensate for each cubic foot of the weak-cation resin is needed to rinse the two cells. Of this 20-gallons/cu. ft. of weak-cation resin, at least half is usually economically suited for immediate reclamation in a typical fertilizer plant with the remainder being stored for further cycling and subsequent reclamation.

As previously mentioned, however, there may be situations where it is not economical to reclaim or consume the weak-acid solution 29 as shown in FIGURE 5. Calculations based on the test results discussed above will show that only about 75–80% of the weak-acid solution at 29 can be used to dilute a 100% solution of nitric acid $[HNO_3]$ to a solution of about 25% strength. Accordingly, in those instances where the weak-acid solution cannot be efficiently reclaimed or consumed, it has been found that such weak-acid solutions can be further treated in such a manner as to obtain distilled water that can, of course, be returned directly to the uncontaminated condensate system of the fertilizer plant. To accomplish this, a procedure as schematically illustrated in FIGURES 6–8 can be followed.

Figure 6:
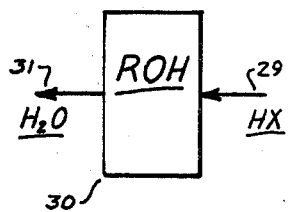

Turning now to FIGURE 6, in this alternative manner of practicing the present invention, the weak-acid solution HX at 29 is contacted with an anion-exchange medium 30 that is initially in the ionic hydroxyl state (represented by the symbol "ROH" in FIGURE 6) from whence distilled water is obtained at 31. Thus, it will be appreciated that by further treating the weak-acid solution 29 in this manner, all so-called "waste products" from the ion-exchange processes depicted in FIGURES 1–5 will be returned to the ammonia plant either as a pure water (as at 31) for the condensate system thereof or as a useful ammonium salt (as at 26) that is economically reclaimed in the fertilizer plant itself.

Figure 7:
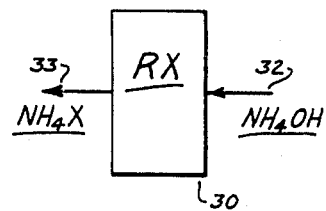

To regenerate the anion medium 30, as seen in FIGURE 7, a solution 32 of either anhydrous ammonia [$NH_3$] (in an aqueous solution) or ammonium hydroxide [$NH_4OH$] is contacted with the anion-exchange medium to obtain at 33 the same correlative ammonium salt $NH_4X$ as previously discussed with reference to FIGURES 3 and 4. The ammonia will, of course, be converted to ammonium hydroxide so the regeneration process is represented by the following equation:

$$NH_4OH + RX \rightarrow ROH + NH_4X \qquad (Eq.\ 8)$$

where "X" is either $SO_4$, $NO_3$ or Cl depending upon which of the three inorganic acids were employed at 23 (FIGURE 2) to regenerate the cation-exchange mediums 21 and 24. Hereagain, as shown in FIGURES 7 and 8, the initial portion of this correlative ammonium salt solution $NH_4X$ at 33 is initially returned to the ammonia plant in the same manner as the concentrated regeneration and rinse effluent 26. Then, during the rinse cycle shown in FIGURE 8, once the strength of the ammonium salt $NH_4X$ at 33 is less than a desired level, the remaining portion is diverted, as at 34, and collected in the tank 28 as seen in FIGURE 9. Once the anion cell 30 is fully rinsed, it is again in readiness to treat the weak-acid solution 29.

It will be understood, of course, that any anion-exchange medium that is capable of removing the strong inorganic acid anions (i.e., sulfates [$SO_4$], chlorides [Cl], or nitrates [$NO_3$]) can be used for the present invention. It is preferred, however, to employ a so-called "weakly-basic" anion-exchange resin inasmuch as only strong-acid anions will have to be removed in the practice of the invention and those resins of this nature that are presently available typically exhibit a higher capacity for removing strong-acid anions that do the so-called "strong-basic" anions resins. Moreover, since it is particularly desirable in the practice of the present invention to minimize the quantities of regenerant and rinse water employed in regenerating the anion cell, a minimum volume of resin is preferred. Typical commercially available weakly-basic anion resins that can be used for the ion-exchange medium 30 are:

| Trade Nomenclature | Manufacturer |
|---|---|
| "Amberlite" IR–45 IRA–68 IRA–93 | Rohm & Haas Co. Philadelphia, Pa. |
| "Dowex" WGR | Dow Chemical Co. Midland, Mich. |
| "Duolite" A–7 | Chemical Process Co. Redwood City, Calif. |
| Permutit "A" | The Permutit Co. New York City, N.Y. |

It will be understood, of course, that data published by these manufacturers can be employed to design a suitable ion-exchange unit once it is determined how much weak-acid solution (as at 29 in FIGURE 6) must be treated for each cycle.

Referring again to Table 1, it will be appreciated that the ion-exchange resin tested exhibits a relatively slow increase of leakage when the ammonia or ammonium ions first break through the resin bed at the end of the service cycle. For example, Table 1 shows that although only about 150-gal./cu. ft. of the particular ammonia-contaminated water could be treated before the leakage was first detected, the leakage had risen to only about 35 to 40-p.p.m. (as $NH_3$) when about 200-gal./cu. ft. was treated. Thus, if this additional 50-gal./cu. ft. of effluent can somehow be contacted with the ion-exchange resin, the effective capacity of the resin would be in the order of 30,500-grains/cu. ft. (expressed as $CaCO_3$) instead of about 24,000-grains/cu. ft. The practical advantages of obtaining such an increase in the quantity of a given ammonia-contaminated water that could be treated in each service cycle are, of course, readily apparent.

Turning now to FIGURE 10, a schematic representation is illustrated of a refinement also contemplated as being within the scope of the present invention. As seen in FIGURE 10, the ion-exchange medium 21 is shown as it reaches the end of the service cycle previously described with reference to FIGURE 1. As indicated by Table 1, the leakage of the unwanted ammonia or ammonium ions will be approaching the maximum level that can be tolerated by the condensate system of the ammonia plant. Accordingly, once this point is reached, the effluent leaving the ion-exchange medium 21 is diverted from the path indicated by the dashed line 34 and brought into contact with an ion-exchange medium 21' which is identical to the ion-exchange medium 21. The flow of ammonia-contaminated condensate 20 is continued through both the ion-exchange medium 21 as well as the ion-exchange medium 21' until the leakage of ammonia or ammonium ions leaving the ion-exchange medium 21 reaches a selected magnitude which is still relatively low. Once this occurs, the ammonia-contaminated condensate is diverted from the ion-exchange medium 21 as indicated by the dashed line 35 and contacted with the ion-exchange medium 21'. The ion-exchange medium 21 is then regenerated in accordance with the methods depicted in FIGURES 2–4 and ultimately returned to service as shown in FIGURE 5 once the ion-exchange medium 21' is exhausted.

It will be appreciated, therefore, that the diversion of the relatively small additional quantity of still low-ammonia water to the ion-exchange medium 21' will actually represent an insignificantly small increase in the total ions that must subsequently be removed by the ion-exchange medium 21' once it is alone reclaiming the ammonia-contaminated condensate 20. The additional quantity of ammonia-contaminated water or condensate 20 that can be treated in this manner will, however, represent a significant increase in the overall efficiency of the methods of the present invention. This technique will, of course, require little or no increase in the quantity of rinse water required and only a slight increase in the quantity of the regenerant HX.

Those skilled in the art will appreciate that the particular arrangement of ion-exchange units for performing the methods of the present invention will depend upon such factors as the type of ion-exchange mediums selected as well as whether a "batch" process or a "column" process is to be conducted. Furthermore, where the column process is selected, a choice may also be made as to whether the ion-exchange medium is fixed or is moving as well as whether the influent and regenerant flow in the same relative direction or in opposite directions past the medium. Thus, it will be understood that the present invention is not limited to only a so-called "fixed-bed column" process.

Turning now to FIGURE 11–A, a preferred arrangement is shown of an ion-exchange installation 100 for practicing the methods of the present invention depicted in FIGURES 1–5. As seen in FIGURE 11–A, the ion-exchange installation 100 is comprised of ion-exchange units 200 and 300 including typical pressure vessels 201 and 301 mounted adjacent to one another in an upright position and respectively having internal distributors 202–204 and 302–304 arranged for so-called "downflow" operation. A weak-cation resin 205 is disposed on the lower distributor 204 in the vessel 201 and a strong-cation resin 305 is similarly disposed on the lower distributor 304 in the vessel 301, with each of these resins being selected in accordance with the foregoing description.

In one manner of controlling the flow of the various streams entering and leaving the ion-exchange units 200 and 300 during the several steps in their operational cycles, appropriately sized piping manifolds 206 and 306 with manual or automatic valves 207–213 and 307–312, respectively, are arranged outside of the vessels and connected to the appropriate internal distributors 202–204 and 302–304 therein. The contaminated condensate is introduced to the ion-exchange installation 100 by an inlet conduit 101 having branched conduits 102 and 103 that are, in turn, respectively connected in parallel to the inlets of the valves 207 and 209 and to the inlets of the valves 307 and 310. Reclaimed condensate is removed from the weak-cation unit 200 by a conduit 104 connected to the outlet of the valve 208. A conduit 105 interconnects the inlet of the valve 211 to the lower portion of the piping manifold 306 of the strong-cation unit 300. The outlets of the valves 210 and 308 are connected by a conduit 106 to a common storage tank (not shown).

A suitably arranged acid storage tank 107 is connected to the suction side of an acid pump 108 having its discharge connected by a conduit 109 to the inlet of the valve 309. The outlet of the valve 212 is connected to a conduit 110 returning to the appropriate ammonium process stream in the associated fertilizer plant (not shown) and the outlet of the valve 213 is connected by way of a conduit 111 to a storage tank 112. The suction side of a pump 113 is connected to the storage tank 112 and its discharge side is connected by a conduit 114 to a valve 311 connected to the upper portion of the piping manifold 306 of the unit 300 and downstream of the valve 310.

Accordingly, ammonia-contaminated condensate is brought to the ion-exchange installation 100 by the conduit 101. Only the valves 207 and 208 are open at this time so that the ammonia-free condensate leaving the weak-cation unit 200 will return to the condensate system of the fertilizer plant by way of the conduit 104. To determine when it is necessary to regenerate the weak-cation unit 200, means are provided for detecting the presence of unwanted ammonia and ammonium ions when they first begin to leak through the resin bed 205. In one manner of accomplishing this, a conventional conductivity cell 214 is arranged between the valve 208 and the conduit 104 to determine whenever the total dissolved solids in the effluent water reach a predetermined level above which it is desired to regenerate the ion-exchange unit 200. The conductivity cell 214 could, of course, also be located on the side of the vessel 201 so as to earlier detect the leakage of ammonium ions through the resin bed 205 therein. Similarly, other devices known to the art could just as well be employed so long as a characteristic indictive of the presence of the unwanted ammonia or ammonium ions can be reliably detected with reasonable accuracy when the weak-cation resin 205 is in need of regeneration. It will be recalled from the description of the methods illustrated in FIGURES 1–5 that the strong-cation resin 305 is at this time already exhausted and will be regenerated in conjunction with the weak-cation resin 205.

Once it is deemed necessary to regenerate the ion-exchange units 200 and 300, the resin beds 205 and 305 should first be adequately backwashed to remove dirt, sediment, or the like, that may have accumulated on the resin particles during the preceding service cycle. To accomplish this, the valves 207 and 208 are closed and the valves 209 and 210 as well as the valves 307 and 308 are opened to backwash the units 200 and 300 either in unison or sequentially. It will be appreciated that if, as illustrated in FIGURE 11–A, the contaminated condensate is to be used as a source of backwash water, the backwash effluent leaving the valves 210 and 308 through the conduit 106 should be collected in a suitable storage facility (not shown) for subsequent filtering and future reclamation. On the other hand, should uncontaminated water be used for the backwash influent, the backwash effluent would not have to be collected. When the backwash cycle is completed, the valves 209, 210, 307 and 308 are closed and the resin beds 205 and 305 are allowed to settle.

The acid pump 108 is then started and the valves 211, 212 and 309 are opened. The regenerant effluent leaving the weak-cation unit 200 by way of the conduit 110 will initially be returned to an appropriate process stream in the fertilizer plant since the valve 213 is closed at this time. As previously described, this will enable the more concentrated correlative ammonium salts to return by way of the conduit 110 to the fertilizer plant for reclamation.

Once a predetermined quantity of acid sufficient to regenerate the ion-exchange units 200 and 300 has been admitted, the acid pump 108 is halted, the valve 309 closed, and the valve 310 opened. This will initiate the rinse cycle for the ion-exchange units 200 and 300. Once the strong-cation unit 300 (which is typically much smaller than the weak-cation unit 200 and thereby requires less rinsing) is adequately rinsed, the valves 211 and 310 are closed and the valve 207 reopened. This will discontinue the rinsing of the strong-cation unit 300 and complete the rinsing of the weak-cation unit 200.

Once it is determined that the concentration of the solution of correlative ammonium salts leaving the weak-cation unit 200 by way of the conduit 110 is so low that these salts are no longer economically reclaimable, the valve 212 is closed and the valve 213 opened to divert the weaker solution of ammonium salts into the conduit 111 leading to the storage tank 112. It will be appreciated that the concentration of these solutions may be determined by suitable control means, such as a conductivity cell 215 in the conduit 109, for detecting at least one property or characteristic indicative of the quality of the rinse effluent and diverting the effluent to the storage tank 112 for future treatment when the detected property passes a predetermined value. The rinsing of the weak-cation unit 200 is, of course, continued until all of the undesirable ammonium salts are removed therefrom. The valve 213 is then closed and the valve 208 reopened to return the weak-cation unit 200 to its service cycle.

Once the weak-cation unit 200 is again treating contaminated condensate, the weak solution collected in the storage tank 112 is reclaimed when desired by starting the pump 113 and opening the valves 311 and 312. The resulting weak-acid effluent from the conduit 115 at the outlet of the valve 312 is discharged to the acid tank 307 for diluting the concentrated acid stored there as well as sent to other points of conshmption as previously discussed. This completes the operation of the ion-exchange installation 100 in accomplishing the methods of the present invention as shown in FIGURES 1–5. It will, of course, be recognized that a duplicate weak-cation unit (not shown) such as the unit 200 can be connected thereto to practice the alternative method described above with respect to FIGURE 10.

Turning now to FIGURE 11–B, a weak-anion ion-exchange unit 400 is shown which is to be associated with the ion-exchange installation 100 in FIGURE 11–A for practicing the methods of the present invention depicted in FIGURES 6–9. The ion-exchange unit 400 includes an upright pressure vessel 401 arranged internally in the same fashion as the vessels 201 and 301 and includes eight manual or automatic valves 402–409 arranged in a suitable piping manifold 410 as shown in the drawings. A weak-anion resin (not shown) is selected in accordance with the foregoing description and suitably disposed in the vessel 401. A conduit 116 connected to the conduit 101 leading from the contaminated condensate source is connected to the inlet of the valves 404 and 408. The inlet of the valve 402 is connected to the dilute acid outlet conduit 115 coming from the strong-cation unit 300 (FIGURE 11–A). The outlet of the valve 403 is connected to a conduit 117 to carry distilled water from the weak-anion unit 400 to the condensate system of the ammonia plant. An ammonia storage tank 118 and a transfer pump 119 are connected by a conduit 120 to the inlet of the valve 405 to supply regenerant to the weak-anion unit 400.

Accordingly, to reclaim acid from the strong-cation unit 300, the valves 402 and 403 are opened, with the other valves 404–409 being closed. Then, once the weak-anion unit 400 is depleted, it is backwashed by opening the valves 404 and 405 with the other valves 402, 403 and 406–409 being closed. Hereagain, where ammonia-contaminated condensate is used, it must also be collected.

The regeneration cycle is initiated by starting the transfer pump 119, closing the valves 404 and 405, and opening the valves 406 and 407. When all of the regenerant has been introduced and the pump 119 halted, the valve 406 is closed and the valve 408 opened to halt the flow of the regenerant and admit rinse water into the unit 400. The valve 407 is left open until the concentration of the correlative ammonium salt flowing back to the ammonia plant by a conduit 121 has reached a predetermined minimum. Then, once this concentration is too low to be economically reclaimed, the valve 407 is closed and the valve 409 opened to divert the weaker solution by way of a conduit 122 to the storage tank 112 (FIGURE 11–A) for subsequent reclamation by the strong-cation unit 300.

It will be recognized, of course, that a conductivity cell, as at 411, or other control means in the conduit 117 can be used to determine when the quality of the distilled water leaving the weak-anion unit 400 is no longer acceptable. Similarly, a conductivity cell 142 can also be arranged to control the diversion of the weak-ammonium salts back to the storage tank 112.

Accordingly, it will be appreciated that the present invention has provided new and improved methods and apparatus for removing ammonia or ammoium ions from water in such manners that no contaminating wastes will be left for creating potential pollution problems. By removing the contaminating ions with ion-exchange techniques and apparatus in accordance with the invention, these ions can be converted into solutions of useful ammonium salts which can be subsequently reclaimed in a conventional ammonia plant leaving only dilute, but useful, by-products.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for treating water containing ammonia or ammonium cations in excess of a predetermined level and comprising the steps of: contacting a strong inorganic acid with first a strongly-acidic cation-exchange media and then with a weakly-acidic cation-exchange media to effect an interchange of ammonium cations respectively retained by each of said media with hydrogen ions in said acid thereby obtaining correlation solutions composed of said cations and the anions of said acid; separating said correlative solutions from said cation-exchange media thereby leaving each of said media with a predominance of exchangeable hydrogen ions thereon; contacting water containing ammonia or ammoium cations in excess of a predetermined level with said weakly-acidic cation-exchange media to effect an interchange of said cations in said water with said exchangeable hydrogen ions on said weakly-acidic cation-exchange media thereby removing at least a portion of said cations in said water and obtaining a treated water with a reduced concentration of said cations; and reclaiming said correlative solutions by contacting at least a portion of said correlative solutions with said strongly-acidic cation-exchange media to effect an interchange of said cations in said correlative solutions with said exchangeable hydrogen ions on said strongly-acidic cation-exchange media thereby obtaining an acidic solution composed of said exchangeable hydrogen ions from said strongly-acidic cation-exchange media and said anions of said acid.

2. The method of claim 1 wherein said strong inorganic acid is selected from a group consisting of sulfuric acid, hydrochloric acid, and nitric acid.

3. The method of claim 1 wherein said strong inorganic acid is sulfuric acid, said correlative solutions are ammonium sulfate solutions, and said acidic solution is dilute sulfuric acid.

4. The method of claim 1 wherein said strong inorganic acid is hydrochloric acid, said correlative solutions are ammonium chloride solutions, and said acidic solution is dilute hydrochloric acid.

5. The method of claim 1 wherein said strong inorganic acid is nitric acid, said correlative solutions are ammonium nitrate solutions, and said acidic solution is dilute nitric acid.

6. The method of claim 1 wherein said weakly-acidic cation-exchange media consists of a particulate cation-exchange resin containing carboxylic acid groups as the functional sites thereof.

7. The method of claim 1 wherein said weakly-acidic cation-exchange media consists of a particulate cation-exchange resin containing carboxylic acid and acrylic groups as the functional sites thereof.

8. The method of claim 1 wherein said weakly-acidic cation-exchange media consists of a particulate cation-exchange resin containing carboxylic acid and phenolic groups as the functional sites thereof.

9. The method of claim 1 further including the steps of: contacting at least a portion of said acidic solution with a basic anion-exchange media having a predominance of hydroxyl anions thereon to effect an interchange of said anions of said acid with said hydroxyl anions thereby obtaining deionized water; contacting said anion-exchange media with a regenerant including hydroxyl anions to effect an interchange of said hydroxyl anions with said anions of said acid on said anion-exchange media thereby obtaining a correlative solution including said anions of said acid; and separating said second correlative solution from said anion-exchange media thereby leaving said anion-exchange media with a predominance of exchangeable hydroxyl anions thereon.

10. The method of claim 9 wherein said regenerant also includes ammonium cations whereby said second correlative solution is composed of said ammonium cations and said anions of said acid.

11. The method of claim 10 further including the step of: contacting at least a portion of said second correlative solution with said strongly-acidic cation-exchange media to effect an interchange of said ammonium cations in said second correlative solution with said exchangeable hydrogen ions on said strongly-acidic cation-exchange media thereby obtaining a second acidic solution composed of said exchangeable hydrogen ions from said strongly-acidic cation-exchange media and said anions of said acid.

12. A method of reclaiming water contaminated with ammonia or ammonium cations and obtaining useful by-product solutions including said contaminating cations comprising the steps of: contacting an aqueous solution of a strong inorganic acid with first a strongly-acidic cation-exchange particulate resin and then a weakly-acidic cation-exchange particulate resin to exchange ammonium cations on each of said resins with hydrogen cations in said acid solution thereby obtaining correlative solutions composed of said ammonium cations and the anions of said acid solution; rinsing said resins with water to remove said correlative solutions therefrom thereby leaving said resins with a predominance of exchangeable hydrogen cations thereon; contacting a water contaminated with ammonia or ammonium cations in excess of a desired level with said weakly-acidic cation-exchange resin to exchange said contaminating cations with said exchangeable hydrogen cations on said weakly-acidic cation-exchange resin thereby obtaining a treated water with a concentration of said contaminating cations below said desired level; and reclaiming said contaminating cations by contacting at least a portion of said correlative solutions with said strongly-acidic cation-exchange resin to exchange said ammonium cations in said correlative solutions with said exchangeable hydrogen cations on said strongly-acidic cation-exchange resin thereby obtaining an acidic solution composed of said hydrogen cations from said strongly-acidic cation-exchange resin and of said anions of said acid solution.

13. The method of claim 12 further including the steps of: measuring a property of said treated water that is characteristic of the presence of said contaminating cations to determine the concentration of said contaminating cations; and, whenever the concentration of said contaminating cations in said treated water is greater than said desired level, repeating the previous steps.

14. The method of claim 12 further including the steps of: measuring a property of said treated water that is characteristic of the presence of said contaminating cations to determine the concentration of said contaminating cations; whenever the concentration of said contaminating cations in said treated water is at a first level greater than said desired level, contacting said treated water with a second weakly-acidic cation-exchange resin having a predominance of exchangeable hydrogen cations to exchange said contaminating cations with said exchangeable hydrogen cations to exchange said contaminating cations with said exchangeable hydrogen cations on said second weakly-acidic cation-exchange resin thereby obtaining a further-treated water with a concentration of said contaminating cations below said desired level; and, whenever the concentration of said contaminating cations in said treated water is at a second level greater than said first level, repeating the previous steps.

15. The method of claim 12 wherein said strong inorganic acid is selected from a group consisting of sulfuric acid, hydrochloric acid, and nitric acid.

16. The method of claim 12 wherein said strong inorganic acid is sulfuric acid, said correlative solutions are ammonium sulfate solutions, and said acidic solution is dilute sulfuric acid.

17. The method of claim 12 wherein said strong inorganic acid is hydrochloric acid, said correlative solutions are ammonium chloride solutions, and said acidic solution is dilute hydrochloric acid.

18. The method of claim 12 wherein said strong inorganic acid is nitric acid, said correlative solutions are ammonium nitrate solutions, and said acidic solution is dilute nitric acid.

19. The method of claim 12 wherein said correlative solutions are progressively removed from said resins as said resins are rinsed to provide an initial portion of said correlative solutions that is more concentrated than the latter portion thereof and wherein only said latter portion of said correlative solutions is contacted with said strongly-acidic cation-exchange resin and further including the step of: evaporating said initial portion of said correlative solutions to further concentrate said ammonium cations and acidic anions therein.

20. The method of claim 12 further including the step of: contacting at least a portion of said acidic solution with a basic anion-exchange particulate resin having a predominance of exchangeable hydroxyl anions thereon to exchange said acidic anions in said acidic solution with said exchangeable hydroxyl anions thereby obtaining deionized water composed of said hydrogen cations in said acidic solution and of said exchangeable hydroxyl anions.

21. The method of claim 20 further including the steps of: contacting an aqueous solution composed of ammonium ions and hydroxyl ions with said basic anion-exchange resins to exchange said hydroxyl ions with said acidic anions on said basic anion-exchange resin thereby obtaining a second correlative solution composed of said ammonium ions and of said acidic anions from said basic anion-exchange resin; rinsing said basic anion-exchange resin with water to remove said second correlative solution therefrom thereby leaving said basic anion-exchange resin with a predominance of exchangeable hydroxyl ions thereon; and contacting at least a portion of said second correlative solution with said strongly-acidic cation-exchange resin to exchange said ammonium ions in said second correlative solution with said exchangeable hydrogen cations on said strongly-acidic cation-exchange resin thereby obtaining a second acidic solution composed of said hydrogen cations from said strongly-acidic cation-exchange resin and of said anions of said acid solution.

22. The method of claim 20 wherein said basic anion-exchange resin is weakly-basic.

23. The method of claim 20 wherein said water for rinsing said resins is contaminated with ammonia or ammonium cations.

24. The method of claim 12 wherein said water for rinsing said resins is contaminated with ammonia or ammonium cations.

References Cited
UNITED STATES PATENTS

| | | | |
|---|---|---|---|
| 2,916,355 | 12/1959 | Swenson | 210—38 X |
| 3,147,215 | 9/1964 | Blight | 210—38 X |
| 3,197,401 | 7/1965 | Arai | 210—38 X |
| 3,336,747 | 8/1967 | Applebaum et al. | 210—38 X |

SAMIH N. ZAHARNA, Primary Examiner

U.S. Cl. X.R.

71—63; 210—30, 37, 38